United States Patent [19]
Crisp et al.

[11] 3,885,461
[45] May 27, 1975

[54] SELF-LOCKING PISTON AND ROD ASSEMBLY FOR A FLUID MOTOR OR THE LIKE

[75] Inventors: Chester A. Crisp, Wilmington; Herschel M. Williamson, Joliet, both of Ill.

[73] Assignee: Caterpillar Tractor Co., Peoria, Ill.

[22] Filed: Oct. 23, 1973

[21] Appl. No.: 408,668

[52] U.S. Cl. ............... 92/258; 92/255; 92/257; 403/259
[51] Int. Cl. .......................... F16j 1/12
[58] Field of Search ...... 92/255, 257, 258; 403/343, 403/259, 320

[56] References Cited
UNITED STATES PATENTS

| 940,068 | 11/1909 | Robinson | 92/258 X |
|---|---|---|---|
| 1,880,894 | 10/1932 | Dorman | 403/320 |
| 2,499,662 | 3/1950 | Mattingly et al. | 92/258 X |
| 2,597,829 | 5/1962 | Stillwagon | 92/258 X |
| 2,970,871 | 2/1961 | Flick | 92/257 X |
| 3,101,651 | 8/1963 | Strader | 92/258 X |

Primary Examiner—Irwin C. Cohen
Attorney, Agent, or Firm—Phillips, Moore, Weissenberger, Lempio & Strabala

[57] ABSTRACT

The piston of a fluid operated linear motor is sealingly secured to the piston rod by means which produce a self-tightening effect in response to the rotational forces often experienced by such pistons in operation. The piston is threadably engaged on a portion of the rod and one end of the piston bites into an adjacent inclined step thereon to provide a seal between the piston and the rod. A lock nut bearing against the piston is threadably engaged on an adjacent portion of the rod which has threads with a finer pitch. Owing to the differences in the threads rotational forces, which might otherwise tend to loosen the piston and seal, have the effect of jamming the piston more tightly against the lock nut.

1 Claim, 1 Drawing Figure

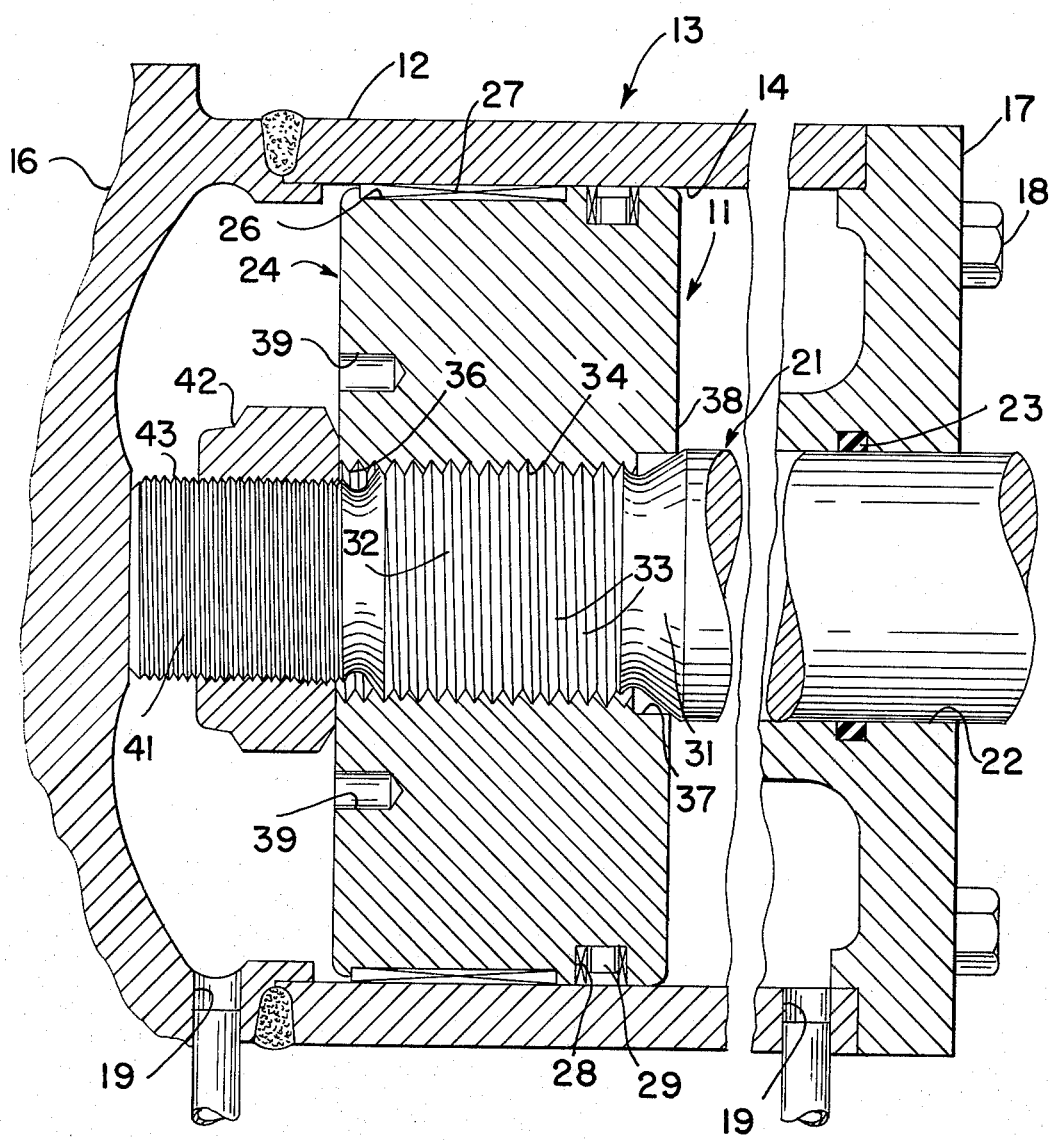

SELF-LOCKING PISTON AND ROD ASSEMBLY FOR A FLUID MOTOR OR THE LIKE

BACKGROUND OF THE INVENTION

This invention relates to piston assemblies of the kind employed in linear fluid motors, pumps, shock absorbers, accumulators and the like and more particularly to a piston and piston rod assembly having means for resisting loosening of the piston on the rod during operation.

A variety of mechanisms such as linear hydraulic motors or jacks, for example, are basically formed of a cylinder having a reciprocal rod extending on the axis thereof and having an internal piston mounted on the rod for reciprocal movement within the cylinder. One of the simpler and more common techniques for securing the piston on the rod is to utilize a threaded engagement either directly between the piston and the rod or between the rod and a lock nut disposed adjacent to the piston and bearing thereagainst. Piston and rod assemblies of this general kind have exhibited a very undesirable tendency to loosen during operation unless complex and costly supplementary means are provided to resist rotational forces which may act on the piston during reciprocation within the cylinder.

Although the internal bore of the cylinder and the adjacent surface of the piston and any sealing means or wear rings disposed therebetween are normally formed with smooth finishes, a spiralling or rifling effect tends to be created in operation and the result is a rotational force on the piston in the course of reciprocation. Vibration, differential fluid pressures, a slight degree of play of the piston and rod relative to the cylinder and a variety of other factors can also give rise to torque forces on the piston which tend to loosen the piston on the rod by alternately winding and unwinding the piston as it reciprocates within the cylinder. Loosening of the attachment between the piston and rod may allow fluid leakage to occur therebetween and increases the risk of breakage.

SUMMARY OF THE INVENTION

This invention provides a simple and economical piston and piston rod assembly for reciprocation in a cylinder wherein rotational forces of the kind encountered in operation act to tighten the attachment of the piston to the rod. The piston is threadably engaged on one portion of the rod with one edge of the piston biting into a tapered step on the rod to provide a fluid seal. The lock nut is then threadably engaged on an adjacent reduced diameter portion of the rod to bear against the piston. The threads of the lock nut and adjacent portion of the rod have a finer pitch than the threads of the piston and the portion of the rod engaged thereby. Owing to the difference in the fineness of the two sets of threads, any rotational torque on the piston of the kind which would otherwise tend to loosen the piston acts to increase the binding pressure between the piston and lock nut.

Accordingly, it is an object of this invention to provide a simple low cost piston and piston rod assembly which resist loosening in the presence of rotational forces encountered in the course of reciprocation within a cylinder.

The invention together with further objects and advantages thereof will best be understood by reference to the following description of a preferred embodiment taken in conjunction with the accompanying drawing.

BRIEF DESCRIPTION OF THE DRAWING

The accompanying drawing is a foreshortened axial section view of a linear hydraulic motor having a piston and piston rod assembly in accordance with the present invention.

BRIEF DESCRIPTION OF A PREFERRED EMBODIMENT

Referring now to the drawing, the piston and piston rod assembly 11 of the present invention is applicable to a variety of devices of the general kind wherein the piston reciprocates within a cylinder 12 either in a driving or driven relationship to fluids therein, linear motors and pumps being typical of such devices. For purposes of example the invention will be hereindescribed as embodied in a double-acting hydraulic linear motor 13 of the kind often referred to as a hydraulic jack. In a typical hydraulic jack 13, the cylinder 12 has a bore 14 which is closed at one end by an end wall 16 that may be welded or otherwise permanently joined to the cylinder. The opposite end of cylinder 12 is closed by a removable annular end wall 17 secured to the cylinder by suitable means such as bolts 18. Suitable ports 19 are provided at each end of the cylinder whereby pressurized fluid may be admitted to one end while the other end is vented in order to drive the piston and piston rod assembly in a desired direction. The piston rod 21 extends axially within cylinder 12 through a central passage 22 in end wall 17, and through an annular seal 23 mounted in the opening, for connection with an external load which is to be driven by the motor 13.

The piston 24 has an outside diameter slightly less than the inside diameter of cylinder bore 14 and has a first annular groove 26 in which an annular wear ring 27 is received. A second annular groove 28 contains a seal ring 29 which blocks fluid leakage between the piston and cylinder wall.

Considering now the structure which attaches the piston 24 to rod 21, a conical step 31 is provided on the rod adjacent a reduced diameter portion 32 thereof which has coarse threads 33. Piston 24 has an axial bore 34 provided with matching threads 36 and is threaded onto rod portion 32 in coaxial relationship thereto. The end 37 of piston bore 34 adjacent step 31 of the rod is unthreaded and of slightly greater diameter than the threaded portion to define a sharp annular edge 38 which bites into step 31 when the piston is tightened on the rod to seal the junction between the rod and piston against fluid leakage. Spaced bores 39 are provided in the opposite end of the piston to facilitate tightening of the piston on the rod with a spanner wrench.

To prevent loosening of the piston 24 in the presence of torque forces, rod 21 has still another stepped portion 41 of lesser diameter than portion 32 and an annular lock nut 42 is threadably engaged on rod portion 41 to bear against the end of piston 24 opposite from step 31 and sealing edge 38. If the threads 43 of rod portion 41 and those of the lock nut 42 were of the same pitch as the threads 33 and 36 of rod portion 32 and piston 24, then it would be possible for a rotational motion of the piston to be accompanied by like rotational motion of the lock nut with the result that loosening would occur. This is avoided by forming the threads 43 of rod portion 41 and those of the lock nut to have a smaller pitch than the threads 33 and 36. Accordingly, any tendency of piston 24 to turn in a direction which would loosen the threaded engagement of the piston on rod portion 32 acts to increase the locking action of nut 42 since any given amount of rotation produces a greater travel of the piston along the rod than does a similar amount of rotation of the nut 42.

While the invention has been described with respect to a single embodiment, it will be apparent that variations are possible and it is not intended to limit the invention except as defined in the following claims.

What is claimed is:

1. A piston and piston rod assembly for reciprocation within a cylinder comprising a piston rod having a first portion with threads thereon of a first pitch and having a second portion with threads thereon of a lesser pitch, an annular piston threadably engaged on said first portion of said rod, the threaded engagement of said piston on said rod being wholly at said first portion thereof, a lock nut threadably engaged on said second portion of said rod and in direct engagement with said piston for exerting axial pressure on said piston, said second portion of said rod being of reduced diameter relative to said first portion thereof and said lock nut has an internal diameter correspondingly smaller than that of said piston, a conical step being formed on said rod adjacent said first portion thereof, and said piston has a threaded bore through which said first portion of said rod extends, said bore having theads engaging said threads of said first portion of said rod with the end of said bore adjacent said step being unthreaded and forming with a planar face of said piston a continuous annular sharp edge which bites into said concial step of said rod upon threading of said piston on said first portion of said rod to block fluid flow between said piston and said rod.

* * * * *